United States Patent [19]

Fotheringham

[11] Patent Number: 4,633,966
[45] Date of Patent: Jan. 6, 1987

[54] SENSOR MOUNTING ARRANGEMENT

[75] Inventor: James R. Fotheringham, Willowick, Ohio

[73] Assignee: Caterpillar Industrial Inc., Mentor, Ohio

[21] Appl. No.: 775,193

[22] Filed: Sep. 12, 1985

[51] Int. Cl.$^4$ .............................................. B60T 8/02
[52] U.S. Cl. ..................................... 180/253; 73/493; 188/181 R; 303/100
[58] Field of Search ................ 180/79, 79.1, 167, 168, 180/169, 252, 253, 264, 197; 73/493, 494, 509; 324/160, 166, 171; 340/870.37; 188/181 R, 181 A; 303/95, 100

[56] References Cited

U.S. PATENT DOCUMENTS

| | | | |
|---|---|---|---|
| 3,331,460 | 7/1967 | Bacon | 180/208 |
| 3,652,886 | 3/1972 | Riordan | 310/168 |
| 3,683,219 | 8/1972 | Kruse | 188/181 A X |
| 3,792,533 | 2/1974 | Plasser et al. | 324/171 X |
| 3,915,266 | 10/1975 | Lantz | 188/181 |
| 3,938,112 | 2/1976 | Gee | 188/181 R X |
| 3,960,248 | 6/1976 | Tribe | 188/181 R |
| 3,978,357 | 8/1976 | Voelbel et al. | 310/168 |
| 4,090,592 | 5/1978 | Jovick et al. | 188/181 R |
| 4,161,120 | 7/1979 | Cloarec | 73/494 |
| 4,189,637 | 2/1980 | Takamatsu et al. | 250/231 |
| 4,288,746 | 9/1981 | Singbartl | 324/174 |

FOREIGN PATENT DOCUMENTS

| | | | |
|---|---|---|---|
| 2612028 | 9/1977 | Fed. Rep. of Germany | 73/493 |
| 2648316 | 4/1978 | Fed. Rep. of Germany | 324/160 |
| 2755379 | 6/1979 | Fed. Rep. of Germany | |
| 2348093 | 11/1977 | France | |

Primary Examiner—John J. Love
Assistant Examiner—Charles R. Watts
Attorney, Agent, or Firm—Alan J. Hickman

[57] ABSTRACT

Sensors of the type capable of delivering a signal representative of the rotated position of an output member frequently fail prematurely because of excessive side and axial loading and electrical conductor damage. A mounting arrangement for a first sensor has an apparatus for connecting an input shaft of the first sensor to an output member, and apparatus for connecting a body of the first sensor to a housing and maintaining the body against rotation about an input shaft axis and thereby reducing the force applied to the sensor body caused by wobble of the first sensor. The mounting arrangement has a connecting shaft and guide assembly, which guides and protects an electrical conductor both internally and externally of the housing, and the first apparatus permits the passing of the electrical conductor thereby. Therefore, premature failure of and damage to the electrical conductor and the first sensor is substantially reduced. The sensor mounting arrangement is particularly suited for use on a steering axle assembly of a work vehicle.

18 Claims, 4 Drawing Figures

FIG-2

SENSOR MOUNTING ARRANGEMENT

DESCRIPTION

1. Technical Field

This invention relates generally to a mounting arrangement for a sensor and, more particularly, to a steerable axle assembly having a sensor responsive to the position of a rotatable output member, and a mounting arrangement for preventing excessive axial and radial loads from being applied to the sensor.

2. Background Art

Steerable axle assemblies have been known wherein a sensor is provided for delivering a signal representative of a rotated position of an output member. Typically, the sensor has a stationary portion mounted on a fixed member, and a rotary portion secured to a rotatable output member. Due to relative rotation between the stationary and rotary portions, a substantial number of sensors fail prematurely. This is primarily caused by improper alignment between the stationary and rotary portions. For example, a resolver, a specific well known type of sensor, has an input shaft which is rotatably connected to the sensor body by bearings. Radial and axial loads applied to the shaft will cause wear and premature failure of the bearings and ultimately the resolver. This is particularly true where the sensor is relatively delicately made and the apparatus upon which it is mounted is substantially large, difficult to manufacture within tolarences, and capable of applying forces of substantial magnitudes due to inadequate alignment.

In a steering axle of the type used on unmanned, automatic guided vehicles (AGV), where dead reckoning is a requirement of the vehicle, it is necessary that a provision be made to sense the pivoted position of the output member of the steering axle assembly about a substantially vertical steering axis, and transmit a signal representative of this position. Also, it is necessary to sense the rotated position and/or rotation of the steerable ground engaging vehicle wheel relative to a reference or base point and transmit a signal representative of this position. Electrical conductors are required to carry the signals generated by these sensors, from the sensors, to a control unit mounted on the vehicle. Because of the close proximity of the sensors to movable parts of the steer axle assembly, the electrical conductors are frequently subjected to wear caused by rubbing which result in electrical shorting of the wires. Since the electrical conductors are often exposed and unprotected, damage and breakage is a common occurrence. This is especially true for the sensor nearest the ground engaging wheel because of its proximity to the spindle and considerable distance from the vehicle and its protection.

Sensors are often connected to axle assemblies at locations inconvenient and/or difficult to access. Typically, the sensors are located between component parts of the axle assembly and require a substantial amount of effort on the part of a technician to access for assembly and disassembly purposes. Also, these locations are typically dirty and tend to cause undesirable contamination of the sensors which further reduces the life of the sensors.

The present invention is directed to overcoming one or more of the problems as set forth above.

DISCLOSURE OF THE INVENTION

In one aspect of the present invention, a mounting arrangement has a housing and an output member connected to the housing and rotatable in the housing about an axis. A first sensor has a body and an input shaft rotatably connected to the body and rotatable about an input shaft axis. A first apparatus connects the input shaft to the output member at a location spaced from the output member and substantially aligns the axis of the input shaft with the axis of the output member, and a second apparatus connects the body of the first sensor to the housing and maintains the body from rotation about the axis of the input shaft. The second apparatus is movable in response to forces applied by the input shaft to the sensor body in at least one of an axial and radial direction relative to the input shaft axis.

In another aspect of the present invention, a steerable axle assembly has a housing and an output member connected to the housing and rotatable about an axis. A steering motor is mounted on the housing and connected to the output member and adapted to rotate the output member. A pinion gear shaft has a longitudinal bore and is rotatably connected to the housing. The pinion gear shaft is located between the steering motor and the second end portion of the output member and along the axis of the output shaft and is adapted to transfer rotary motion from the steering motor to the output member. A connecting shaft having a first end portion is connected to the output member. The connecting shaft extends axially along the output member axis from the second end portion of the output member to a location at which the connecting shaft first end portion is spaced from the second end portion of the output member. The connecting shaft is disposed in the longitudinal bore of the pinion shaft and extends past the first end of the pinion shaft. A first sensor having a body, and an input shaft rotatably connected to the body, is adapted to deliver a signal representative of the rotated position of the input shaft. A first apparatus connects the input shaft to the first end portion of the connecting shaft and substantially aligns an axis of the input shaft with the axis of the output member and a second apparatus connects the body of the first sensor to the housing and maintains the body from rotation about the axis of the input shaft. The second apparatus is adapted to permit movement of the body of the first sensor in axial and radial directions relative to input shaft axis. A support bracket is connected to the first end portion of the output member and a spindle is rotatably connected to the support bracket. A second sensor has a body connected to the support bracket and an input shaft rotatably connected to the second sensor body. The second sensor input shaft is rotatable in response to rotation of the spindle and adapted to deliver a signal representative of the rotated position of the second sensor shaft.

In another aspect of the present invention, a vehicle has a frame, and a housing connected to the frame. An output member having an axis and first and second end portions is connected to the housing and rotatable about the axis. A steering motor, which is mounted on the housing, is connected to the output member and adapted to rotate the output member about the axis. A pinion gear shaft having opposed ends and a longitudinal bore opening at the opposed ends is connected to the housing. The pinion gear shaft is located between the steering motor and output member and adapted to transfer rotary motion from the motor to the output member. A tubular connecting shaft is connected to the output member and extends from the second end of the output member, along the axis and through the pinion gear shaft bore to a location at which a first end portion of the connecting shaft is spaced from a second end of the output member and pinion gear shaft ends. A supporting bracket is connected at a first supporting bracket end portion to the first end of the output member. A spindle is rotatably connected to the second end portion of the supporting bracket and a wheel is mounted on a first end portion of the spindle and rotatable with the spindle. First and second sensors each having a body and an input shaft rotatably connected to the body are provided. The second sensor body is mounted on the second end portion of the support bracket and the second sensor input shaft is drivingly connected to the second end portion of the spindle. The tubular connecting shaft is connected at its second end portion to the second sensor and a clamp having first and second spaced apart end portions separated by a middle portion is connected at its first end portion to the first end portion of the tubular connecting shaft and at its second end portion to the input shaft of the first sensor. The clamp middle portion is open to the first end portion of the tubular connecting shaft and adapted to pass an electrical conductor to a location spaced from the tubular connecting shaft. A linkage assembly is pivotably connected to and between a collar connected to the body of the first sensor and a base member connected to the housing. The linkage assembly is pivotably movable relative to the base member and the collar in response to movement of the first sensor body.

The first and second apparatus, through their unique construction, provide for axial and radial movement of the first sensor body which eliminates undesirable side and axial loading of the first sensor's input shaft, and therefor, reduces premature failure caused by excessive loading. Because the second apparatus prevents rotation of the body about the input shaft axis, the degree of accuracy of location can be maintained within a preselected location. Therefore, the first sensor will accurately transmit signals representative of the actual location of the steer axle assembly about its substantially vertical axis. In addition, the first and second apparatus permit the use of a resolver, a special type of sensor, in a somewhat hostile environment which is not normally suitable.

Because the second apparatus permits a preselected amount of freedom of movement of the first sensor body, the manufacturing tolerances between the component parts of the steering axle assembly which controls the alignment between the output member and the input shaft of the second sensor may be relaxed, thereby reducing the scrap rate and the like.

Because the conductors are protected by the tubular connecting shaft between the first and second sensors, the incidence of premature failure caused by rubbing, impact, contamination, and the like, is substantially reduced. Since the electrical conductor is able to twist within the tubular connecting shaft the need for a mechanical connection, such as a commutation ring is eliminated.

Due to the fact that the first sensor is mounted on the first end of the tubular connecting shaft, and the second sensor is mounted on the second end portion of the support bracket at a location adjacent the second end portion of the spindle, the ability to access the sensors for service and the like is substantially improved over those in which the sensors are located elsewhere.

BEST MODE FOR CARRYING OUT THE INVENTION

Figure 1:
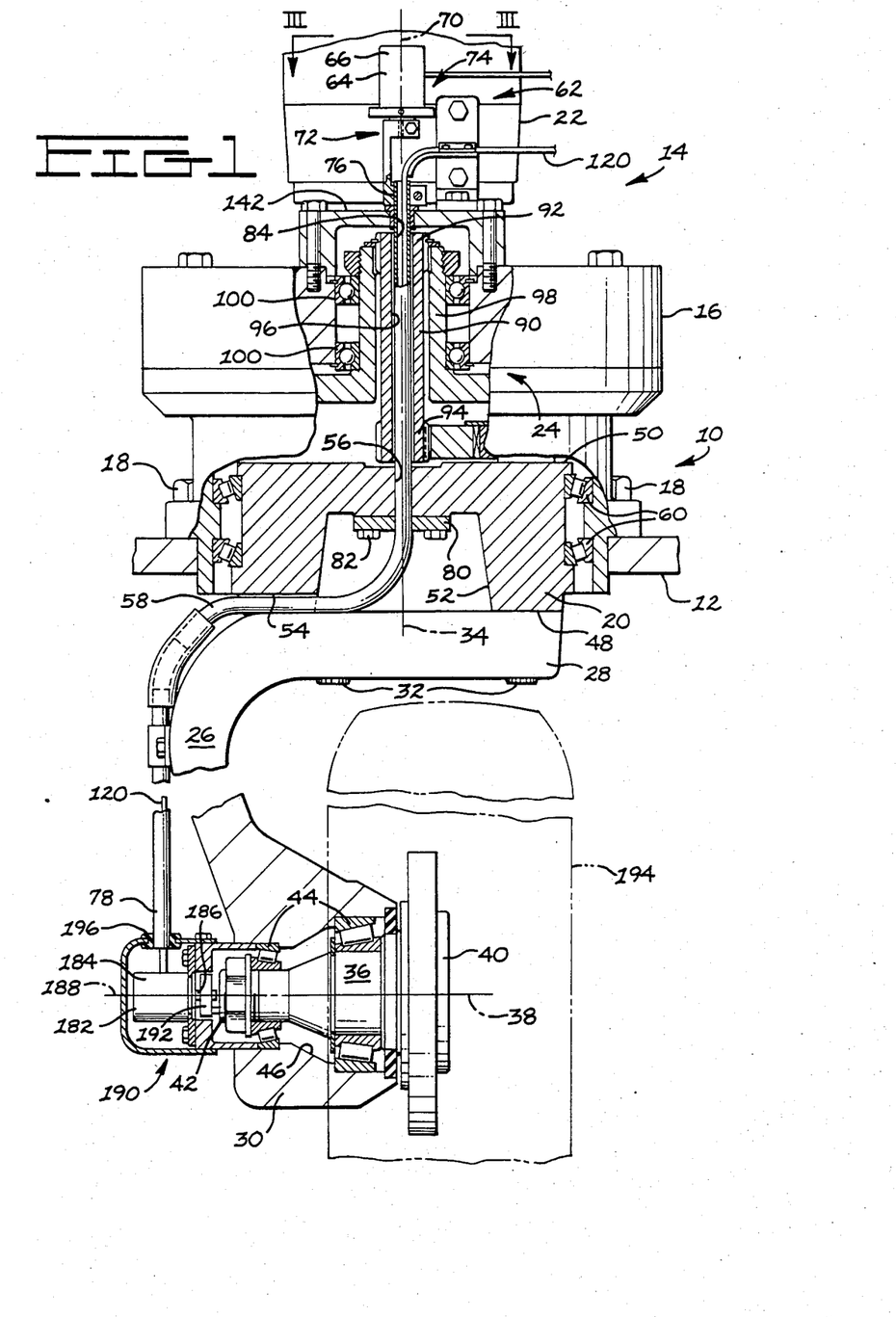
FIG. 1 is a diagrammatic front elevational view of an embodiment of the present invention showing a steering axle assembly of the pivoted steering type, a mounting arrangement for connecting a first sensor to an output member, and a second sensor connected to the steering axle assembly at a location adjacent a second end portion of a wheel spindle.

With reference to the drawings, and particularly FIG. 1, a work vehicle 10, for example, an automatic guided vehicle, a lift truck, tow vehicle, and the like, has a frame 12, and an axle assembly 14 mounted thereon. The axle assembly 14 preferably has a housing 16 connected to the vehicle frame 12 by a plurality of fasteners 18, an output member 20 rotatably mounted in the housing, and a power means 22, for example, a drive motor, mounted on the housing 16 and rotatably connected to the output member 20. A transmission 24, preferably a planetary transmission, is connected to and between the rotary output (not shown) of the drive motor 22 and the output member 20.

A support bracket 26 having first and second end portions 28,30 is connected to the output member at its first end portion 28 by a plurality of fasteners 32. The support bracket is pivotal with and in response to rotary motion of the output member 20 about a longitudinal axis 34. A spindle 36 has a longitudinal axis 38 and first and second end portions 40,42. A plurality of bearings 44 are disposed in a bore 46 in the support bracket second end portion 30. The bearings 44 support the spindle 36 for rotation about the spindle axis 38.

The output member 20 has first and second spaced apart ends 48,50 which are preferably parallel to one another and normal to the axis 34. A recess 52 is disposed axially in the output member 20 and opens at the first end 48. An opening 54 is disposed radially in the output member 20, and an aperture 56 is disposed axially in the output member 20 and opens at the first and second end portions 48,50. Preferably, the aperture 56 lies along axis 34 and opens at the first end portion into the recess 52. The opening 54 and the aperture 56 are of a size sufficient to pass a connecting shaft 58 therethrough. A pair of antifriction bearings 60, which are preferably tapered roller bearings 60, mount the output member 20 in the housing 16 for rotation about the axis 34.

A mounting arrangement 62 connects a first sensor 64 to the housing 16 and output member 20. The first sensor 64 has a body 66, and an input shaft 68. The input shaft 68 is connected to the body in any suitable manner by which the input shaft 68 may be rotatable about an input shaft axis 70. The mounting arrangement 62 includes a means 72 for connecting the input shaft 68 to the output member 20 at a location spaced from the output member 20 and substantially aligns input shaft axis 70 with the output member axis 34. The input shaft 68 is rotatable in response to and with rotation of the output member 20. The mounting arrangement 62 includes a means 74 for connecting the body of the first sensor 64 to the housing, maintains the body against rotation about the input shaft axis 70, and reduces forces applied to the sensor body 66. The means 74 is movable in at least one of an axial and a radial direction relative to the input shaft axis 70 in response to the input shaft 68 applying a force on the sensor body 66.

Figure 4:
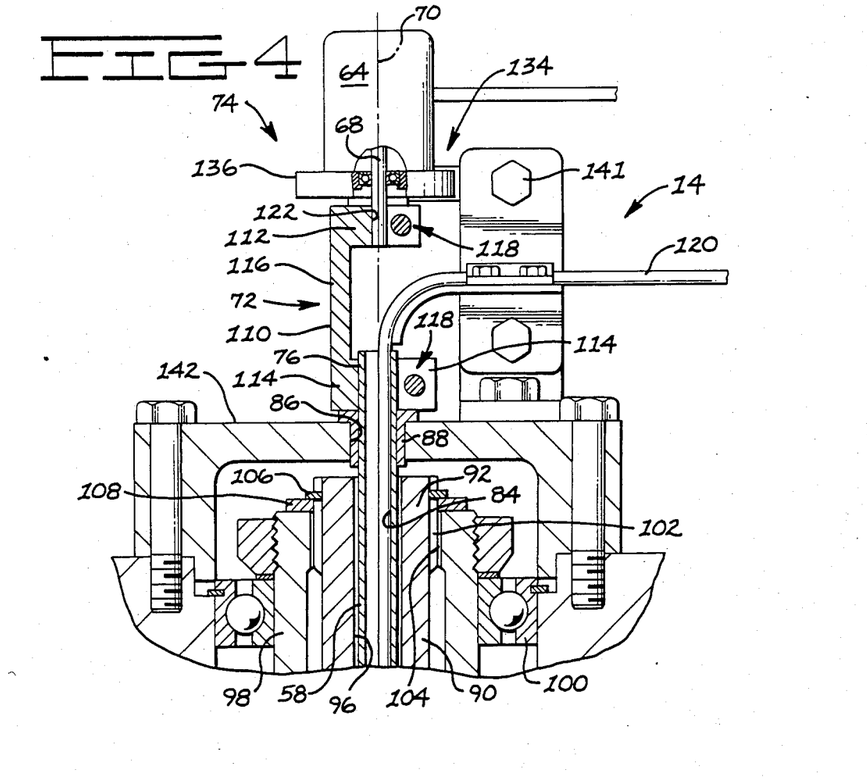
FIG. 4 is an enlarged cross sectional view taken along lines IV—IV of FIG. 3 showing the mounting arrangement for the first sensor in greater detail.

The connecting shaft 58 has first and second end portions 76,78 and is connected to the output member 20. The connecting shaft 58 is disposed in the aperture 56 and extends outwardly therefrom along the axis 34 to a location at which the first end portion 76 is spaced from the output member's second end 50. A flange 80 is connected to the connecting shaft 58 at a location spaced from the connecting shaft's first end portion 76 by any suitable fastening technique, such as, welding, braising, pressing, and the like. Means 82, for example, a threaded fastener, is provided for connecting the flange 80 to the first end 48 of the output member 20. More specifically, the flange is disposed in the recess 52 and connected thereto by a plurality of the threaded fasteners 82. Thus, the connecting shaft 58 is rotatable with rotation of the output member 48. Preferably the connecting shaft 58 is tubular and has an aperture 84 which extends along the length of the connecting shaft 58 and opens at the first 76 and second 78 end portions thereof. As best seen in FIG. 4, the first end of the connecting shaft extends through a bore 86 in the housing 16 at a location adjacent the first sensor 64. A bushing 88 is disposed in the housing bore 86 and supports the connecting shaft first end portion 76 for rotation with the output member 20.

With reference to FIG. 1, the transmission 24 has a pinion gear shaft 90 which has opposed end portions 92,94 and a longitudinal bore 96 opening at opposed ends 92,94. The connecting shaft 58 is disposed in the pinion gear shaft bore 96 and extends past both end portions 92,94 thereof. The pinion gear shaft 90 is connected to the housing 16 and positioned between the power means 22 and the output member 20. The pinion gear shaft 90 extends along the output member axis 34 and is adapted to rotate about the output member axis 34 and transfer rotary motion from the power means 22 to the output member 20. The pinion gear shaft 90 is supported in the housing by a ring gear 98 which is rotatably connected to the housing via a plurality of bearings 100. More specifically, and with reference to FIG. 4, the pinion gear shaft 90 has an external spline 102 at end portion 92 which is engageable with an internal spline 104 on the ring gear 98. A snap ring 106 is connected to the end portion 92 and engages a thrust washer 108 which is contactably supported by the ring gear 98. Thus, the pinion gear shaft 90 is supported substantially vertically in the housing and rotatable with the ring gear 98.

Means 72 preferably includes a clamp 110 having first and second spaced apart end portions 112,114 and a middle portion 116 which is connected to and between the first and second spaced apart end portions 112,114. Means 118 fastens the first and second clamp end portions 112,114 to the connecting and input shafts 58,68, respectively. The clamp middle portion 116 is open to and free from blocking the aperture 84 at the first end portion 76 of the connecting shaft so that an electrical conductor 120 may pass from the aperture 84 at the first end portion 76 of the connecting shaft to a location spaced from the steering axle assembly 14.

Figure 2:
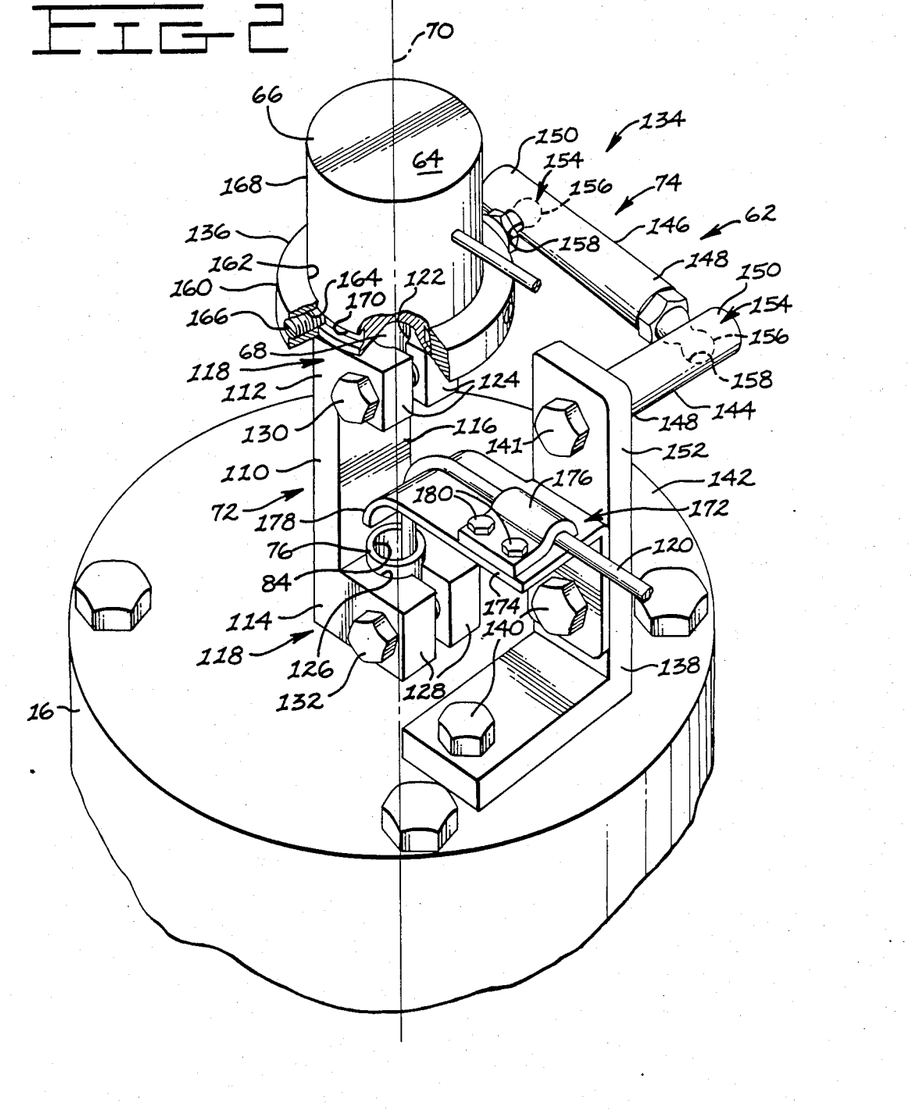
FIG. 2 is an isometric diagrammatic view of the first sensor and mounting arrangement showing a means for connecting an input shaft of the first sensor to an output member of the steering axle assembly, and a means for connecting a body of the first sensor to the housing.
Figure 3:
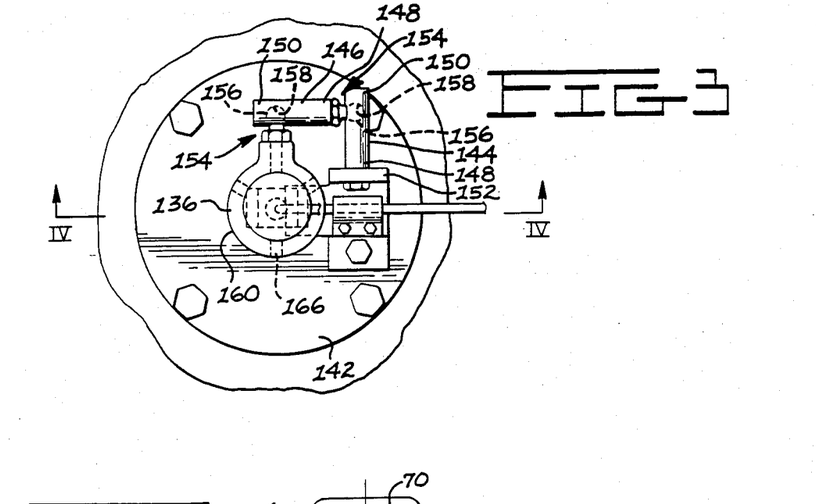
FIG. 3 is a top elevational view of the steering axle assembly of FIG. 1 showing the first sensor mounting arrangement in greater detail.

Referring to FIGS. 2-4, the clamp first end portion 112 has a first bore 122 extending therethrough and a first pair of bifurcated ends 124 which are movable to change the diameter of the first bore 122. The clamp second end portion 114 has a second bore 126 extending therethrough and a second pair of bifurcated ends 128 which are movable to change the diameter of the bore 126. The first and second bores 122,126 are substantially axially aligned with respect to one another and open to each other. The middle portion 116 is radially open relative to the axis of the bores 122,126 so as to provide passage of the heretofore mentioned conductor 120. In side elevation, the clamp has substantially a C-shaped configuration. The first sensor input shaft 68 is disposed in the first bore 122 and the fastening means 118, which is preferably a first screwthreaded fastener 130, is connected to the first pair of bifurcated ends 124 and suitable for forcing the bifurcated ends 124 towards one another which clamps the first end portion 112 to the input shaft 68. Similarly, a second screwthreaded fastener 132 is connected to the second pair of bifurcated ends 128, and secures the first end portion 76, which is disposed in the second bore 126, to the clamp second end portion 114. It is to be noted that although the clamp provides for relative accuracy in alignment between the input shaft and the connecting shaft, tolerance stack up between associated parts due to manufacturing tolerances will invariably cause some misalignment. Therefore, it is necessary to provide the means 74, which will accept a controlled maximum amount of misalignment, and prevent the transferring of undesirable axial and radial loads from the input shaft 68 to the first sensor body 66.

The means 74 alleviates a load transfer problem through the provision of a linkage assembly 134 which pivotally connects the first sensor body 66 to the housing 16. The linkage assembly 134 includes a collar 136 which is affixed to the body 66, and a base member 138 which is connected to the housing at a location adjacent the first sensor 64 and the connecting shaft first end portion 76, for example, by fastener 140. The base member 138 is preferably an L-shaped bracket which is rigidly connected to an upper surface 142 of the housing 16. The linkage assembly 134 further includes first and second links 144,146, each having first and second spaced apart end portions 148,150. The first link 144 is rigidly secured at its first end portion 148 to an upstanding leg portion 152 of base member 138 via fastener 14. A joint means 154, for example, a ball 156 and socket 158, universally pivotally connects the first end portion 148 of the second link 146 to the second end portion 150 of the first link 144, and the second end portion 150 of the second link 146 to the collar 136. Collar 136 has an outer surface 160, a through bore 162 disposed in the collar, and a plurality of threaded apertures 164 disposed in the collar and opening at the outer surface 160 and bore 162. The body 66 is disposed in the bore 162 and secured thereto via a plurality of threaded fasteners 166 screwthreadably disposed in the threaded apertures 164. The first sensor body 66 has a cylindrical outer surface 168 and an annular groove 170 disposed about the body. The threaded fasteners 166 preferably are engaged in the annular groove 170.

A guide assembly 172 which consists of a formed bracket 174 and a clip 176 is connected to the base member 138 and electrical conductor 120, and supports the electrical conductor at a location adjacent the first end portion 76 of the connecting shaft 58. The bracket has a bent end portion 178 which is curved to generally guide and support the electrical conductor 120 at a location adjacent the aperture 84 at the first end 76 of the connecting shaft 58. The clip 176 is affixed to the bracket 174 by a plurality of fasteners 180. The clip overlies the conductor 120 and sandwiches the conductor therebeneath. It is to be noted that a single wire conductor is shown; however, a plurality of conductors may be retained in this manner.

With reference to FIG. 1, a second sensor 182, which is preferably identical in construction to the first sensor 64, has a body 184 and an input shaft 186 connected to the body 184 and rotatable about a longitudinal second sensor input shaft axis 188. The second sensor body 184 is mounted on the support bracket by a carrier assembly 190 and the input shaft 186 is drivingly connected to the second end portion 42 of the spindle 36 by a coupling 192. The second sensor 182 is preferably a resolver which is capable of delivering one or more output signals representative of the rotated angular position of a wheel 194 which is mounted on the first end portion 40 of the spindle 36. The second end portion 78 of connecting shaft 58 is connected to the second sensor 182 and more specifically is connected to the carrier 190 via a rubber grommet 196 which is disposed in an aperture in the carrier 190. It is to be noted that the connecting shaft 58 protects the electrical conductor 120 at an exposed location between the first end portion 48 of the output member 20 and the second sensor 182.

INDUSTRIAL APPLICABILITY

In operation, and with reference to the drawings, the steerable axle assembly 14, and particularly the output member 20 is rotatable, in response to actuation of the power means 22, about the substantially vertical axis 34 to pivot wheel 194 and thereby guide the vehicle as it traverses the underlying terrain. The rotary output of the power means (not shown) is reduced in speed and transferred to the output member 20 via planetary transmission 24. The first sensor 64, being responsive to the position of the output member 20, is rotatable with rotation of the output member 20. Because the input shaft 68 is connected to the output member 20 by the connecting shaft 58 and clamp 110, rotation of the output member 20 results in rotation of the input shaft 68. The means 74 which connects the body 66 of the first sensor 64 to the housing 16 permits axial and radial movement of the body in response to axial and radial movement of the input shaft 68 and thereby compensate for out-of-alignment conditions of the sensor body 66 relative to the input shaft axis 70 and the output member axis 34.

It is to be noted that the output member 20 does not rotate a complete 360°. Therefore, the construction of the clamp permits the passing of an electrical conductor 120 through the connecting shaft aperture 84, between the first and second sensors 64 and 182, past first sensor 64 and clamp 110, and to a control unit (not shown). It should be noted that the pinion gear shaft bore 96 and the connecting shaft 58 are free from engagement with one another to permit relative movement between the pinion gear shaft 90 and the connecting shaft 58. This is necessary since the rotational speed of the pinion gear shaft 90 is substantially greater in magnitude than the rotatable speed of the connecting shaft 58 and the output member 20.

As the vehicle traverses the underlying terrain, wheel 194, which is mounted on spindle 36, will rotate. Because the input shaft 186 of the second sensor 182 is coupled to the spindle via a coupling 192, it will rotate in response to rotation of the wheel 194. Rotation of the second sensor input shaft 186 generates a signal which is carried by the electrical conductor 120 to the control unit mounted on the vehicle. Since the electrical conductor 120 is protected by tubular connecting shaft 58 from impact, rubbing, contaminants, and the like, premature failure of the electrical conductor 120 is minimized. Since the electrical conductor 120 passes through the housing 16 within the tubular connecting shaft 58, and the tubular connecting shaft is closed to the fluids and movable parts within the housing 16, the potential for premature failure of the electrical conductor 120 caused by friction and chemical reactions between the conductor and the fluids within the housing is minimized. Also, the exposed portion of the connecting shaft 58 between the output member 20 and the second sensor 182 shields the conductor 120 and prevents conductor damage caused by contact with external objects and the like. The second sensor 182 is similarly protected by the carrier 190, and the potential for contamination by dust, dirt, grease, oil, and the like, is reduced.

Because the second sensor 182 is located adjacent the spindle second end portion 42 and away from the wheel 194, the second sensor 182 is readily accessible without requiring removal of the wheel 194, spindle 36, and other associated components. Also, this location is much cleaner than other locations with respect to the wheel 194.

The axle assembly and in particular the first and second sensors 64,182 provide all the necessary output signals to accurately and precisely navigate the vehicle. The first sensor 64 delivers suitable signals to the control unit to inform the control unit of the steered position of the output member 20 (also the wheel 194) which is necessary for proper navigation of the work vehicle 10. The second sensor 182 is capable of delivering a signal representative of the rotated angular position of the wheel 194 so that the control unit knows the precise position of the work vehicle 10 along its route within a preselected amount of maximum error.

Other aspects, objects, and advantages of this invention can be obtained from a study of the drawings, disclosure, and the appended claims.

I claim:

1. A mounting arrangement, comprising:
   a housing;
   an output member having an axis and being connected to said housing and rotatable in said housing about said axis;
   a first sensor having a body and an input shaft rotatably connected to said body, said input shaft having an axis and being rotatable about said axis;
   means for connecting the input shaft to said output member at a location at which the input shaft is axially spaced from said output member, and substantially axially aligning the axis of said input shaft with the axis of said output member, said input shaft being rotatable in response to rotation of said output member; and means for connecting the body of said first sensor to said housing and maintaining said first sensor body from rotation about the axis of the input shaft and for movement in at least one of an axial and radial direction relative to the input shaft axis, said means for connecting the first sensor body to said housing being movable, in response to said input shaft applying a force to said first sensor body in at least one of said anxial and radial directions relative to said input shaft axis, to permit said movement of the first sensor body and reduce the force applied to said first sensor body.

2. The mounting arrangement, as set forth in claim 1, wherein said means for connecting the input shaft to the output member includes:
  a connecting shaft having a first end portion and being connected to said output member, said connecting shaft extending from said output member, along the output member axis, to a location at which said connecting shaft first end portion is spaced from said output member;
  a clamp having first and second spaced apart end portions and being connected at said clamp first end portion to the connecting shaft first end portion and at said clamp second end portion to said input shaft; and
  means for fastening the first and second clamp end portions to said connecting and input shafts, respectively.

3. A mounting arrangement, comprising:
  a housing;
  an output member having an axis and being connected to said housing and rotatable in said housing about said axis;
  a first sensor having a body and an input shaft rotatably connected to said body, said input shaft having an axis and being rotatable about said axis;
  means for connecting the input shaft to said output member at a location spaced from said output member, and substantially axially aligning the axis of said input shaft with the axis of said output member, said input shaft being rotatable in response to rotation of said output member;
  means for connecting the body of said first sensor to said housing and maintaining said body from rotation about the axis of the input shaft, said means for connecting the first sensor body to said housing being movable, in response to said input shaft applying a force to said first sensor body, in at least one of an axial and a radial direction relative to said input shaft axis, to reduce the force applied to said first sensor body, said means for connecting the input shaft to the output member includes;
  a connecting shaft having a first end portion and being connected to said output member, said connecting shaft extending from said output member, along the output member axis, to a location at which said connecting shaft first end portion is spaced from said output member;
  a clamp having first and second spaced apart end portions and being connected at said clamp first end portion to the connecting shaft first end portion and at said clamp second end portion to said input shaft; and
  means for fastening the first and second clamp end portions to said connecting and input shafts, respectively, said connecting shaft having an aperture opening at said connecting shaft first end portion, and said clamp having a middle portion connected to and between said first and second clamp end portions, said middle portion being free from blocking the connecting shaft aperture at the connecting shaft first end portion and adapted to pass an electrical conductor from the connecting shaft aperture to a location spaced from said clamp.

4. The mounting arrangement, as set forth in claim 3, wherein said clamp first end portion has a first bore, and a first pair of bifurcated ends, and said clamp second end portion has a second bore and a second pair of bifurcated ends, said clamp first and second bores being substantially axially aligned and said connecting shaft first end portion being disposed in the clamp second bore and said input shaft being disposed in the clamp first bore, said fastening means including first and second fasteners, said first fastener being connected to said first pair of bifurcated ends and said second fastener being connected to said second pair of bifurcated ends.

5. A mounting arrangement, comprising:
  a housing;
  an output member having an axis, first and second spaced apart ends and an aperture extending along the axis of the output member and opening at said output member first and second ends, said output member being connected to said housing and rotatable in said housing about said axis;
  a first sensor having a body and an input shaft rotatably connected to said body, said input shaft having an axis and being rotatable about said axis;
  means for connecting the input shaft to said output member at a location spaced from said output member, and substantially axially aligning the axis of said input shaft with the axis of said output member, said input shaft being rotatable in response to rotation of said output member;
  means for connecting the body of said first sensor to said housing and maintaining said body from rotation about the axis of the input shaft, said means for connecting the first sensor body to said housing being movable, in response to said input shaft applying a force to said first sensor body, in at least one of an axial and a radial direction relative to said input shaft axis, to reduce the force applied to said first sensor body, said means for connecting the input shaft to the output member includes;
  a connecting shaft having a first end portion and being connected to said output member, said connecting shaft extending from said output member, along the output member axis, to a location at which said connecting shaft first end portion is spaced from said output member, said connecting shaft being disposed in the aperture of said output member and extending past the output member first and second ends;
  a clamp having first and second spaced apart end portions and being connected at said clamp first end portion to the connecting shaft first end portion and at said clamp second end portion to said input shaft;
  means for fastening the first and second clamp end portions to said connecting and input shafts, respectively;
  a flange connected to said connecting shaft at a location spaced from the connecting shaft first end portion; and
  means for connecting said flange to the first end of the output member.

6. The mounting arrangement, as set forth in claim 5, wherein said connecting shaft has an aperture extending along the length of the connecting shaft and opening at the connecting shaft first and second end portions, and including:
- a support bracket having first and second end portions and being connected at the support bracket first end portion to the first end of the output member; and
- a second sensor connected to the support bracket second end portion and the second end portion of the connecting shaft.

7. A mounting arrangement, comprising:
a housing;
an output member having an axis and being connected to said housing and rotatable in said housing about said axis;
power means for rotating the output member;
a first sensor having a body and an input shaft rotatably connected to said body, said input shaft having an axis and being rotatable about said axis;
means for connecting the input shaft to said output member at a location spaced from said output member, and substantially axially aligning the axis of said input shaft with the axis of said output member, said input shaft being rotatable in response to rotation of said output member;
means for connecting the body of said first sensor to said housing and maintaining said body from rotation about the axis of the input shaft, said means for connecting the first sensor body to said housing being movable, in response to said input shaft applying a force to said first sensor body, in at least one of an axial and a radial direction relative to said input shaft axis, to reduce the force applied to said first sensor body, said means for connecting the input shaft to the output member includes;
a connecting shaft having a first end portion and being connected to said output member, said connecting shaft extending from said output member, along the output member axis, to a location at which said connecting shaft first end portion is spaced from said output member;
a clamp having first and second spaced apart end portions and being connected at said clamp first end portion to the connecting shaft first end portion and at said clamp second end portion to said input shaft; and
means for fastening the first and second clamp end portions to said connecting and input shafts, respectively, said power means including;
a pinion gear shaft having opposed ends and a longitudinal bore opening at said pinion gear shaft opposed ends, said connecting shaft being disposed in the bore of said pinion gear shaft and extending past said pinion gear shaft ends, said pinion gear shaft being connected to said housing and positioned between said power means and said output member and extending along the axis of the output member, said pinion gear shaft being adapted to rotate about the axis of the output member and transfer rotary motion from said power means to said output member.

8. The mounting arrangement, as set forth in claim 7, wherein said connecting shaft has a second end portion and an aperture extending along the length of said connecting shaft and opening at said connecting shaft first and second end portions, said connecting shaft first end portion extending past one of the pinion gear shaft end portions, and said connecting shaft second end portion extending past the pinion gear shaft other end portion.

9. A mounting arrangement, comprising:
a housing;
an output member having an axis and being connected to said housing and rotatable in said housing about said axis;
a first sensor having a body and an input shaft rotatably connected to said body, said input shaft having an axis and being rotatable about said axis;
means for connecting the input shaft to said output member at a location spaced from said output member, and substantially axially aligning the axis of said input shaft with the axis of said output member, said input shaft being rotatable in response to rotation of said output member;
means for connecting the body of said first sensor to said housing and maintaining said body from rotation about the axis of the input shaft, said means for connecting the first sensor body to said housing being movable, in response to said input shaft applying a force to said first sensor body, in at least one of an axial and a radial direction relative to said input shaft axis, to reduce the force applied to said first sensor body, said means for connecting the input shaft to the output member includes;
a connecting shaft having a first end portion and being connected to said output member, said connecting shaft extending from said output member, along the output member axis, to a location at which said connecting shaft first end portion is spaced from said output member;
a clamp having first and second spaced apart end portions and being connected at said clamp first end portion to the connecting shaft first end portion and at said clamp second end portion to said input shaft; and
means for fastening the first and second clamp end portions to said connecting and input shafts, respectively, and said means for connecting the body of said first sensor to said housing includes;
a base member connected to said housing at a location adjacent said clamp;
a collar connected to said first sensor body; and
a linkage assembly pivotally connected to and between said collar and base member and being pivotally movable relative to said housing in response to movement of said first sensor body.

10. The mounting arrangement, as set forth in claim 9, wherein said collar has an outer surface, a bore, a plurality of threaded apertures opening at said outer surface and bore, and a plurality of threaded fasteners screwthreadably disposed in said threaded apertures of said collar, said first sensor body being disposed in said collar bore and engaged by said fasteners.

11. The mounting arrangement, as set forth in claim 10, wherein said first sensor body has a cylindrical outer surface and an annular groove disposed about said body, and fasteners being engaged in said annular groove.

12. The mounting arrangement, as set forth in claim 9, wherein said linkage assembly includes:
first and second links each having first and second spaced apart end portions, said first link being rigidly secured at said first link first end portion to said base member; and joint means for universally pivotally connecting the first end portion of the second link to the second end portion of the first link and the second end portion of the second link to the collar.

13. The mounting arrangement, as set forth in claim 9, wherein said connecting shaft has an aperture opening at the connecting shaft first end portion, including:
an electrical conductor disposed in and extending from the aperture at the first end portion of the connecting shaft; and
a guide assembly connected to the base member and said electrical conductor, and supporting said electrical conductor at a location adjacent the first end portion of the connecting shaft.

14. A steerable axle assembly, comprising:
a housing;
an output member having an axis, and first and second end portions, and being connected to said housing and rotatable about said axis;
a steering motor mounted on said housing, connected to said output member, and adapted to rotate said output member;
a pinion gear shaft having a longitudinal bore and being rotatably connected to said housing between the steering motor and the second end portion of the output member, said pinion gear shaft extending along the axis of the output shaft and adapted to transfer rotary motion from said steering motor to said output member;
a connecting shaft having a first end portion and being connected to said output member, said connecting shaft extending axially along the output member axis from the second end portion of the output member to a location at which the connecting shaft first end portion is spaced from the second end portion of the output member, said connecting shaft being disposed in the longitudinal bore of the pinion shaft and extending past the pinion shaft;
a first sensor having a body and an input shaft rotatably connected to said body, said first sensor delivering a signal representative of the rotated position of the input shaft, said input shaft having a longitudinal axis;
means for connecting the input shaft to the first end portion of the connecting shaft and for substantially axially aligning the input shaft axis with the axis of the output member;
means for connecting the body of said first sensor to said housing and maintaining said body from rotation about the axis of said input shaft, said means for connecting the first sensor body to said housing being adapted to permit movement of the first sensor body in axial and radial directions relative to the input shaft axis;
a support bracket connected to the first end portion of the output member;
a spindle rotatably connected to said support bracket; and
a second sensor having a body and an input shaft rotatably connected to the second sensor body, said second sensor input shaft having a longitudinal axis of rotation, said second sensor body being mounted on said support bracket and said second sensor input shaft being rotatable in response to rotation of said spindle, said second sensor being adapted to deliver a signal representative of the rotated position of said second sensor input shaft.

15. The steerable axle assembly, as set forth in claim 14, wherein said connecting shaft has a second end portion and an aperture opening at said connecting shaft first and second end portions, said connecting shaft second end portion being connected to the second sensor, including:
an electrical conductor disposed in the aperture of said connecting shaft and extending past the first and second end portions of the connecting shaft; and
said means for connecting the input shaft to the connecting shaft first end portion being adapted to pass the electrical conductor from the first end portion of the connecting shaft to a location spaced from said connecting shaft first end portion.

16. The steerable axle assembly, as set forth in claim 15, wherein said means for connecting the input shaft to the connecting shaft first end portion includes a clamp having first and second spaced apart end portions, first and second bores, respectively, in said clamp first and second end portions, and a middle portion connected to and between said clamp first and second end portions and open to said clamp first and second bores, said connecting shaft first end portion being disposed in said clamp second bore, and said first sensor input shaft being disposed in the clamp first bore, said clamp first and second bores being axially aligned.

17. The steerable axle assembly, as set forth in claim 16, wherein said means for connecting said first sensor body to said housing includes first and second links pivotally connected to each other and to and between the body of said first sensor and said housing.

18. A vehicle, comprising:
a frame;
a housing connected to said frame;
an output member having an axis, first and second end portions, and being connected to said housing and rotatable about said axis;
a drive motor mounted on said housing and connected to said output member, said drive motor being adapted to rotate said output member;
a pinion gear shaft having opposed ends, a longitudinal bore opening at said opposed ends and being connected to said housing, said pinion gear shaft being located between said drive motor and said output member and positioned to lie along the axis of the output member, said pinion gear shaft being adapted to rotate about the axis of said output member and to transfer rotary motion from said drive motor to said output member;
a tubular connecting shaft having first and second end portions and being connected to said output member, said tubular connecting shaft extending from the second end of said output member, along said axis, through the pinion gear shaft bore, and to a location at which the connecting shaft first end portion is spaced from the output member second end and pinion gear shaft ends;
a supporting bracket having first and second end portions and being connected at the first end portion to the first end of the output member;
a spindle having first and second end portions and being rotatably connected to the second end portion of the supporting bracket;
a wheel mounted on the first end portion of the spindle and rotatable with said spindle;
first and second sensors each having a body and an input shaft rotatably connected to said body, said second sensor body being mounted on the second end portion of the support bracket and said second sensor input shaft being drivingly connected to the second end portion of the spindle, said second end portion of the connecting shaft being connected to said second sensor;

a clamp having first and second spaced apart end portions separated by a middle portion and being connected at said clamp second end portion to the first end portion of the tubular connecting shaft and at the clamp first end portion to the input shaft of the first sensor, said middle portion being open to the first end portion of said tubular connecting shaft and adapted to pass an electrical conductor to a location spaced from said tubular connecting shaft;

a collar connected to the body of the first sensor;

a base member connected to said housing; and a linkage assembly pivotally connected to and between said collar and the base member, said linkage assembly being pivotally movable relative to said base member and said collar in response to movement of the body of the first sensor.

* * * * *